US010220380B2

(12) United States Patent
Han et al.

(10) Patent No.: US 10,220,380 B2
(45) Date of Patent: Mar. 5, 2019

(54) APPARATUS AND METHOD FOR QUANTITATIVELY COATING CATALYST SUPPORT

(75) Inventors: Hyun Sik Han, Kyeonggi-do (KR); Seung Chul Na, Kyeonggi-do (KR); Sang Yun Han, Kyeonggi-do (KR)

(73) Assignee: Heesung Catalysts Corporation, Kyeonggi-Do (KR)

( * ) Notice: Subject to any disclaimer, the term of this patent is extended or adjusted under 35 U.S.C. 154(b) by 1300 days.

(21) Appl. No.: 14/348,418

(22) PCT Filed: Mar. 14, 2012

(86) PCT No.: PCT/KR2012/001837
§ 371 (c)(1),
(2), (4) Date: Aug. 12, 2014

(87) PCT Pub. No.: WO2013/047965
PCT Pub. Date: Apr. 4, 2013

(65) Prior Publication Data
US 2014/0363578 A1    Dec. 11, 2014

(30) Foreign Application Priority Data

Sep. 29, 2011 (KR) .......................... 10-2011-0098682

(51) Int. Cl.
*B01J 37/02* (2006.01)
*B01J 3/03* (2006.01)
(Continued)

(52) U.S. Cl.
CPC ............. *B01J 37/0215* (2013.01); *B01J 3/03* (2013.01); *B01J 35/04* (2013.01); *C10G 1/02* (2013.01);
(Continued)

(58) Field of Classification Search
CPC .......... B01J 35/04; B01J 37/0215; B01J 3/03; B05D 3/0493; B05D 7/22; C10G 1/02; C10G 1/10
(Continued)

(56) References Cited

U.S. PATENT DOCUMENTS 3,948,213 A * 4/1976 Hoyer ...................... B01J 3/006
118/428
4,191,126 A   3/1980 Reed et al.
(Continued)

FOREIGN PATENT DOCUMENTS

JP    2009-233595 A    10/2009
JP    2009233595 A *  10/2009
WO   2011080525 A1    7/2011

OTHER PUBLICATIONS

International Search Report for PCT/KR2012/01837 dated Aug. 28, 2012.

*Primary Examiner* — Alexander M Weddle
(74) *Attorney, Agent, or Firm* — Meunier Carlin & Curfman LLC

(57) ABSTRACT

Disclosed herein is a method of coating a catalyst support, in which a monolithic catalyst support provided therein with a plurality of longitudinally formed channels is quantitatively coated with catalyst slurry applied to post-treatment of exhaust gas, including the steps of: introducing catalyst slurry into a quantitative container whose bottom is vertically moved; moving a catalyst support to the top of a container such that the bottom of the catalyst support and top of the container are horizontally disposed each other; sealing the bottom of the catalyst support and the top of the container from the outside; moving the bottom of the container upward; and applying a vacuum to the channels of the catalyst support.

4 Claims, 9 Drawing Sheets

(51) Int. Cl.
*B01J 35/04* (2006.01)
*C10G 1/02* (2006.01)
*C10G 1/10* (2006.01)
B05D 3/04 (2006.01)
B05D 7/22 (2006.01)

(52) U.S. Cl.
CPC .............. *C10G 1/10* (2013.01); *B05D 3/0493* (2013.01); *B05D 7/22* (2013.01)

(58) Field of Classification Search
USPC .......... 118/50; 427/350; 502/527.11, 527.18, 502/527.19
See application file for complete search history.

(56) References Cited

U.S. PATENT DOCUMENTS

| | | | |
|---|---|---|---|
| 4,550,034 A | 10/1985 | Shimrock et al. | |
| 4,609,563 A | 9/1986 | Shimrock et al. | |
| 6,746,716 B2 * | 6/2004 | Kiessling | B01J 35/04 427/230 |
| 7,323,054 B2 | 1/2008 | Aderhold et al. | |
| 2003/0003232 A1 * | 1/2003 | Rosynsky | B05D 7/22 427/294 |

* cited by examiner

[FIG. 1]
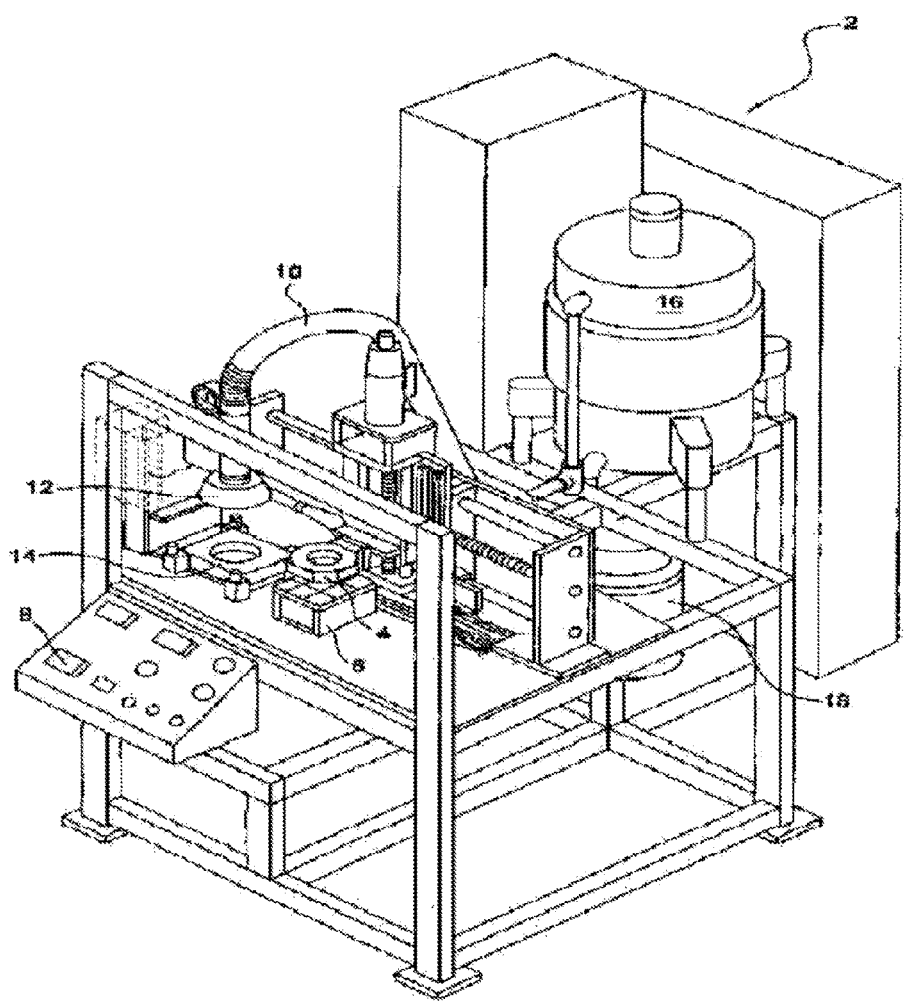
PRIOR ART

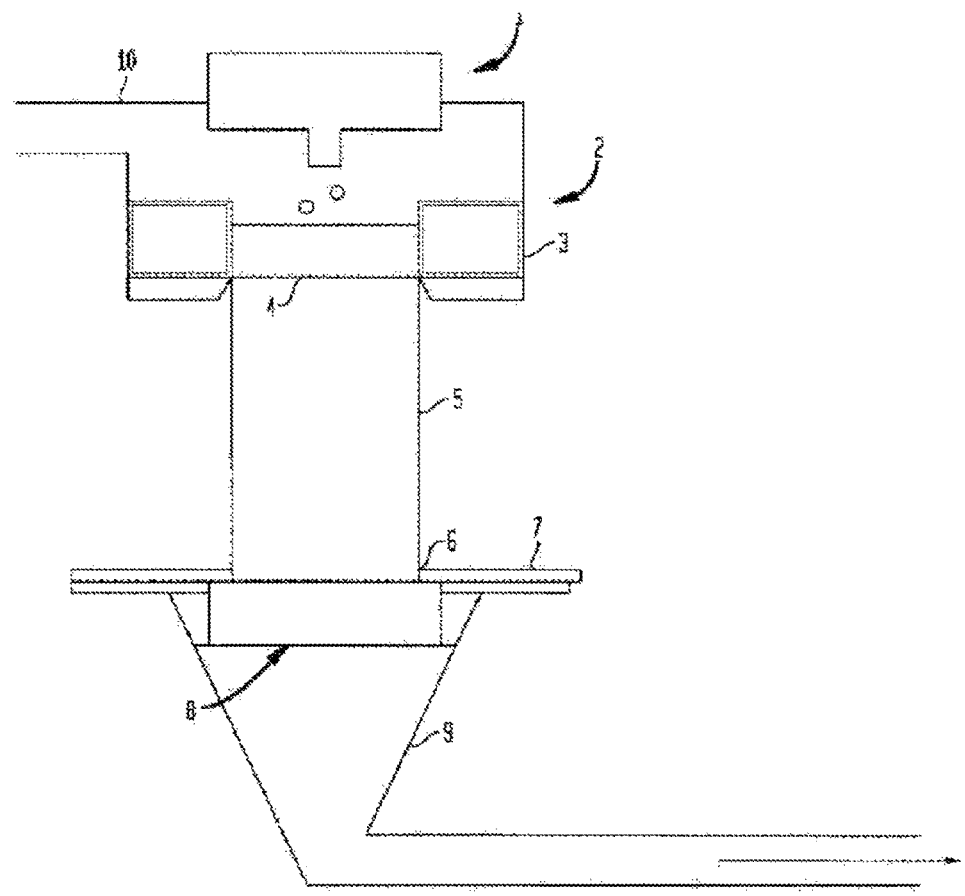
PRIOR ART

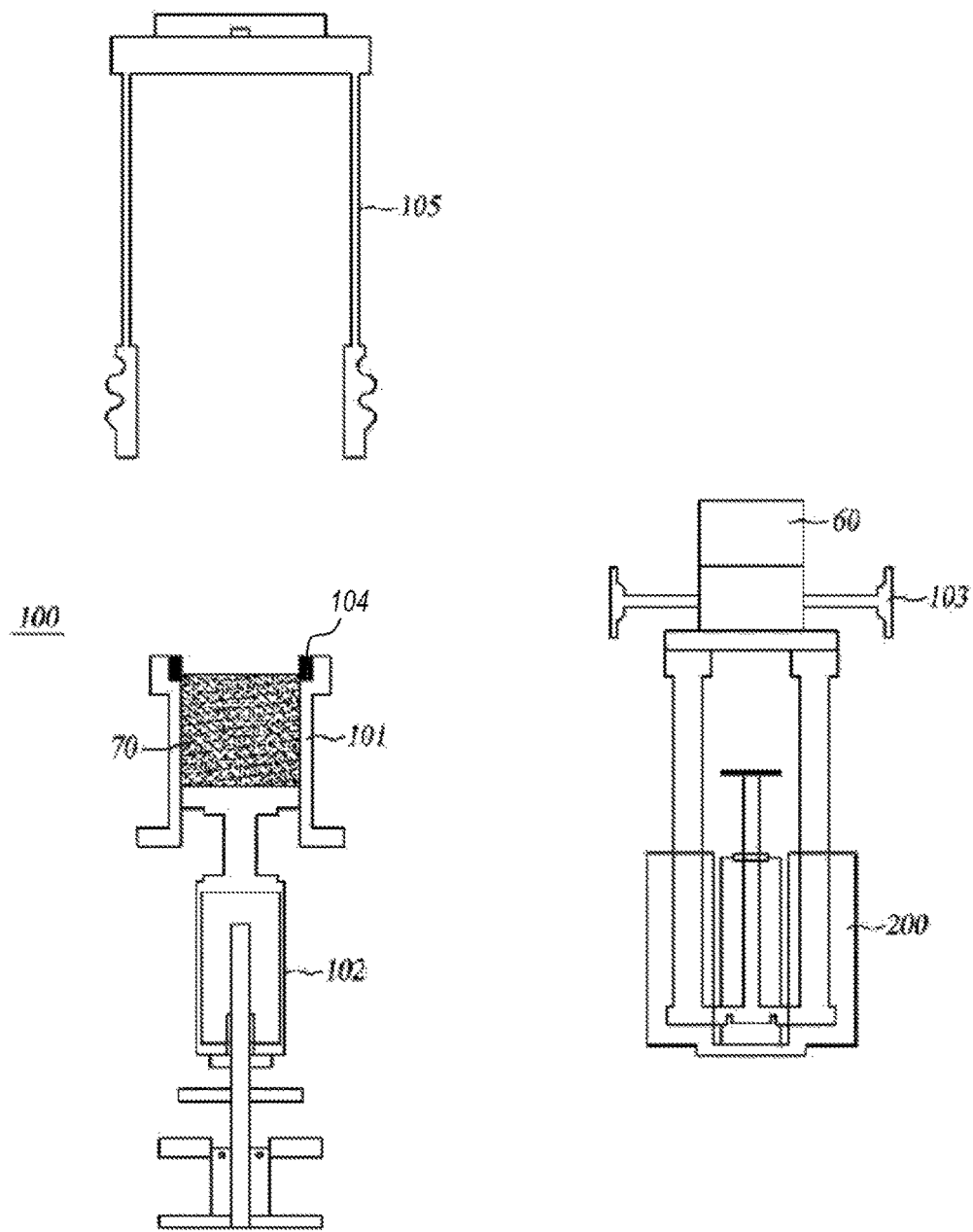
[FIG. 3A]

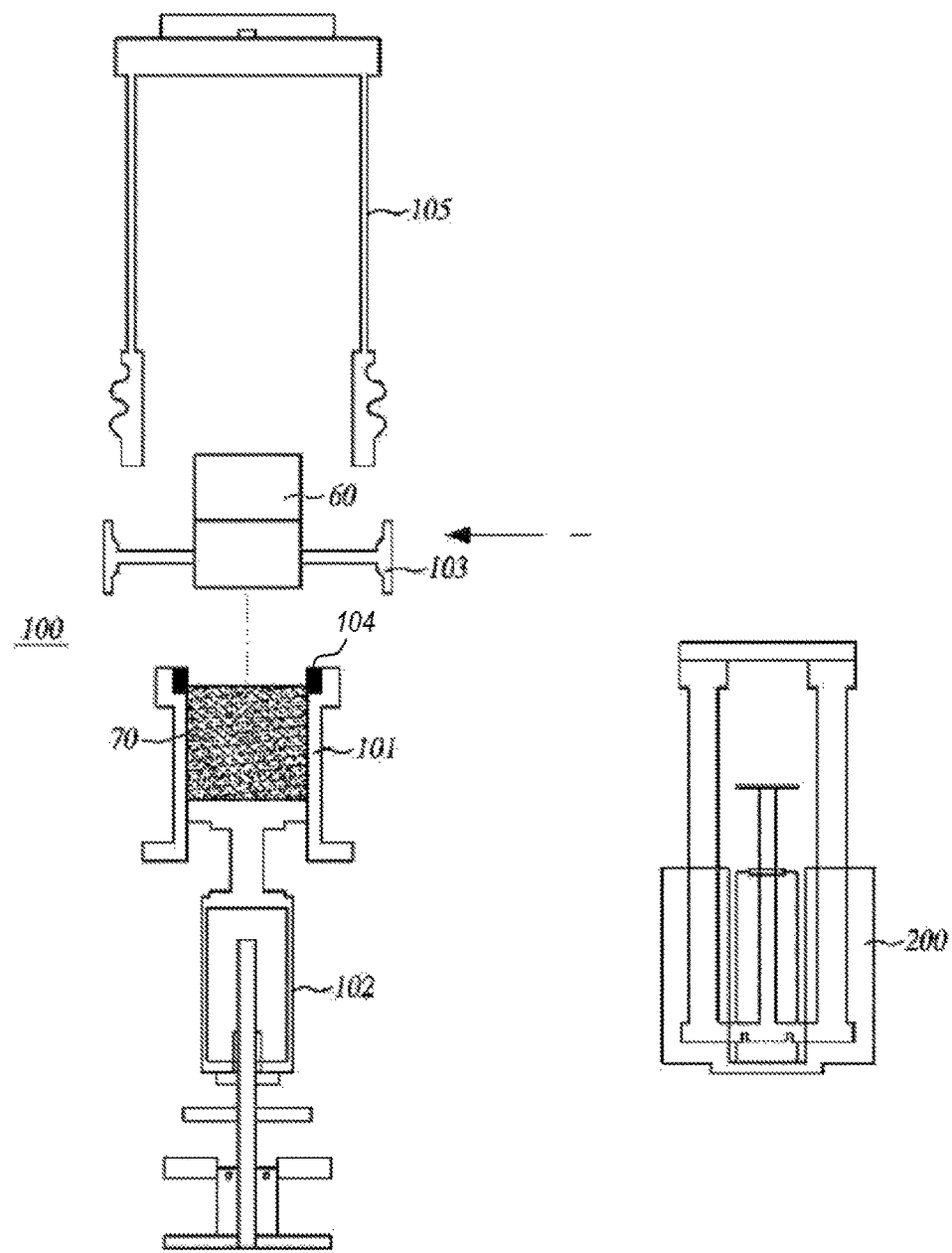
[FIG. 3B]

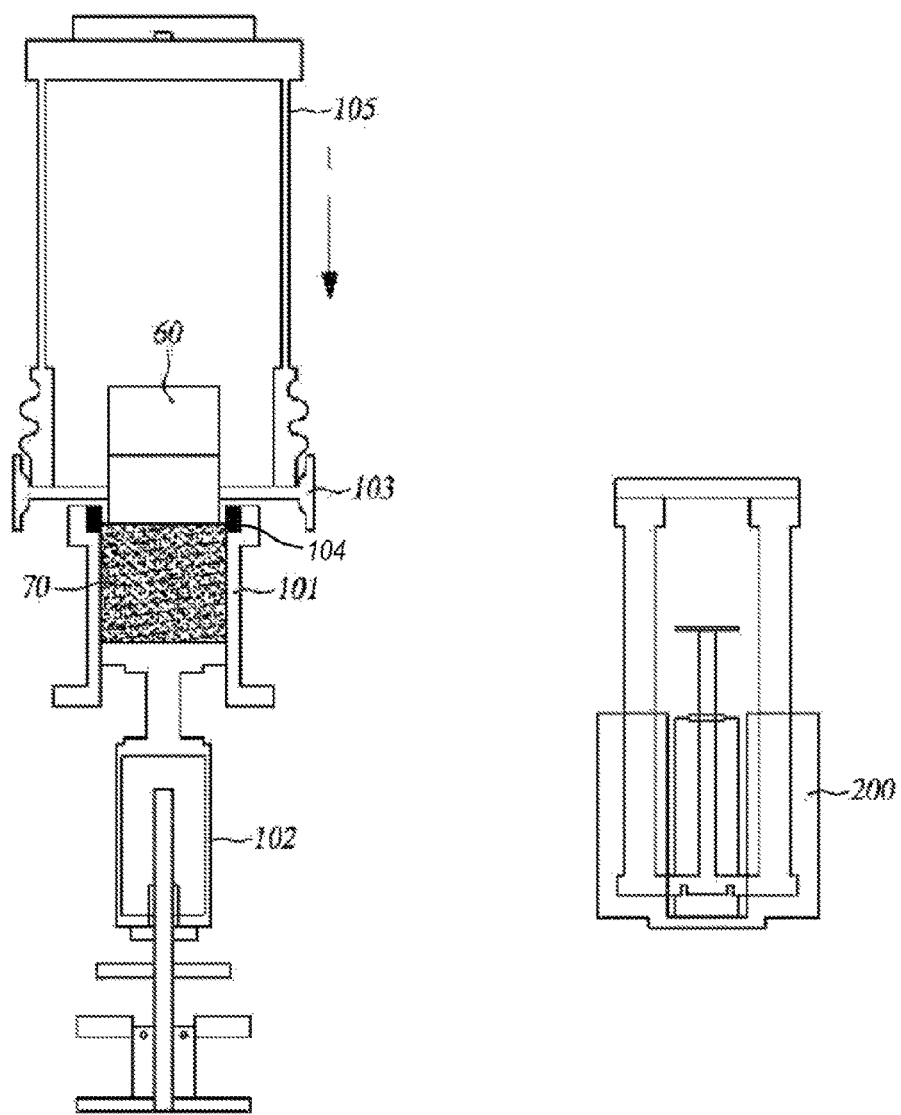
[FIG. 3C]

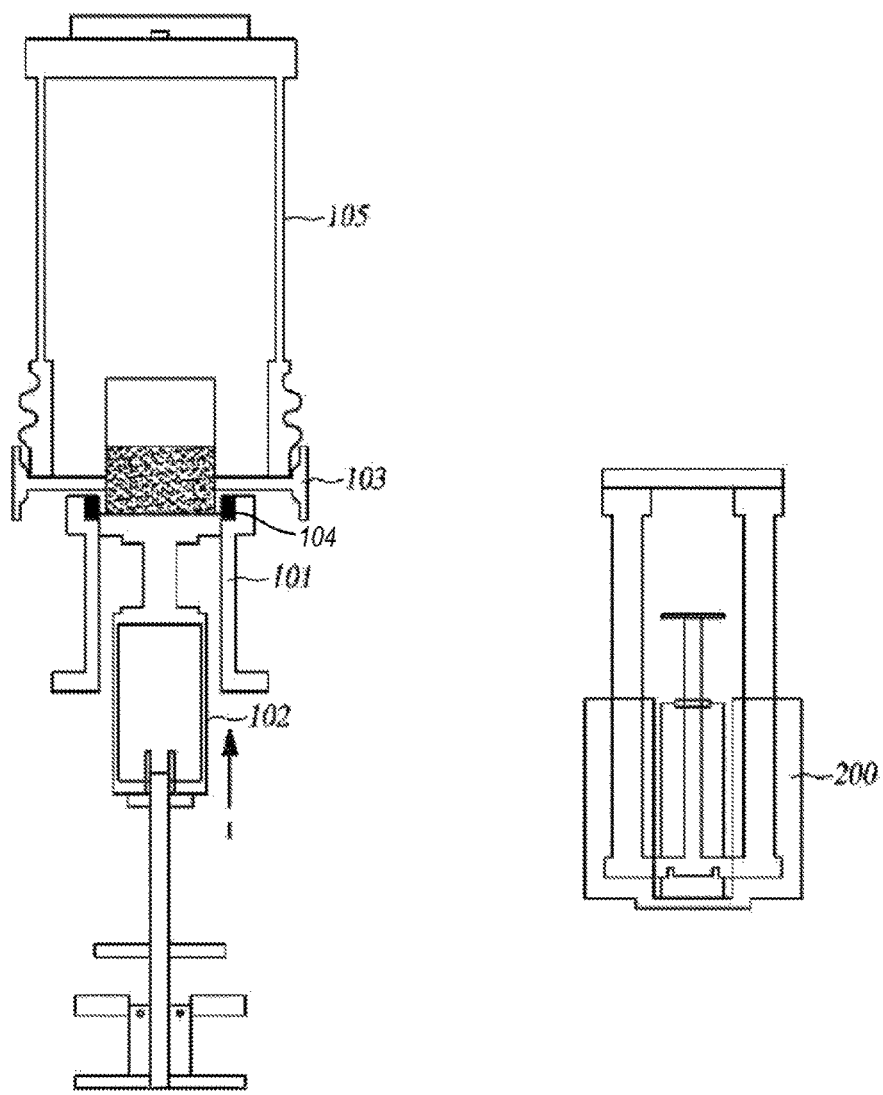
[FIG. 3D]

[FIG. 3E]
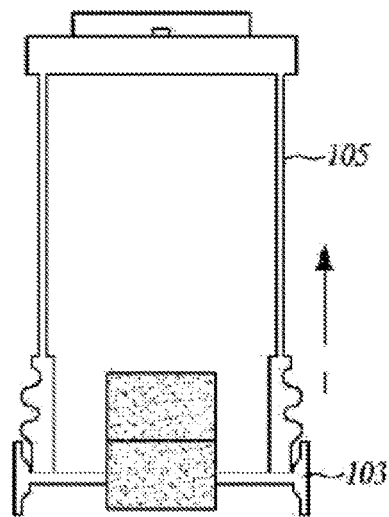
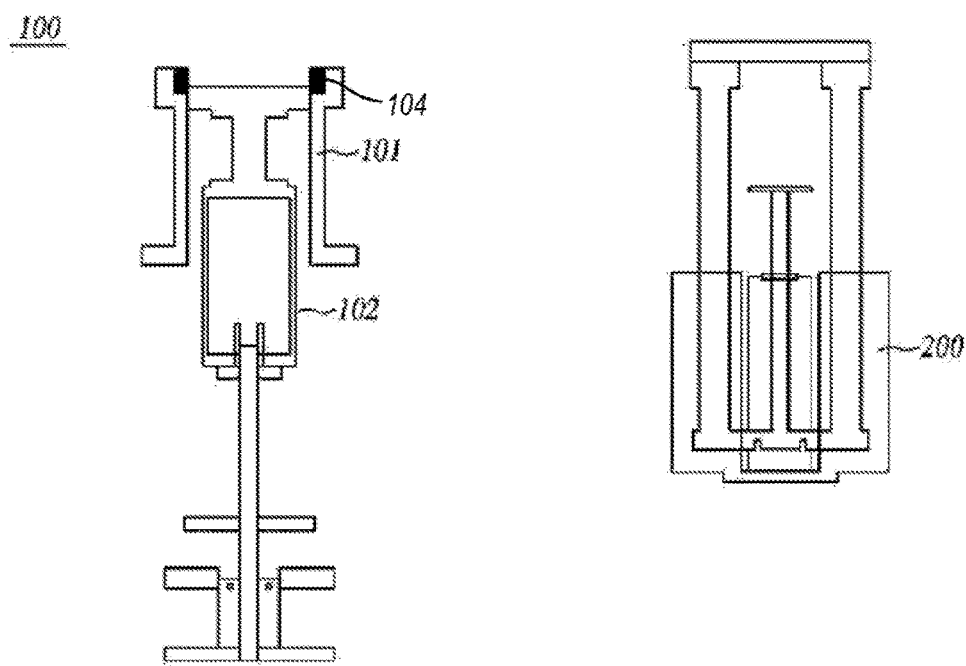

[FIG. 3F]
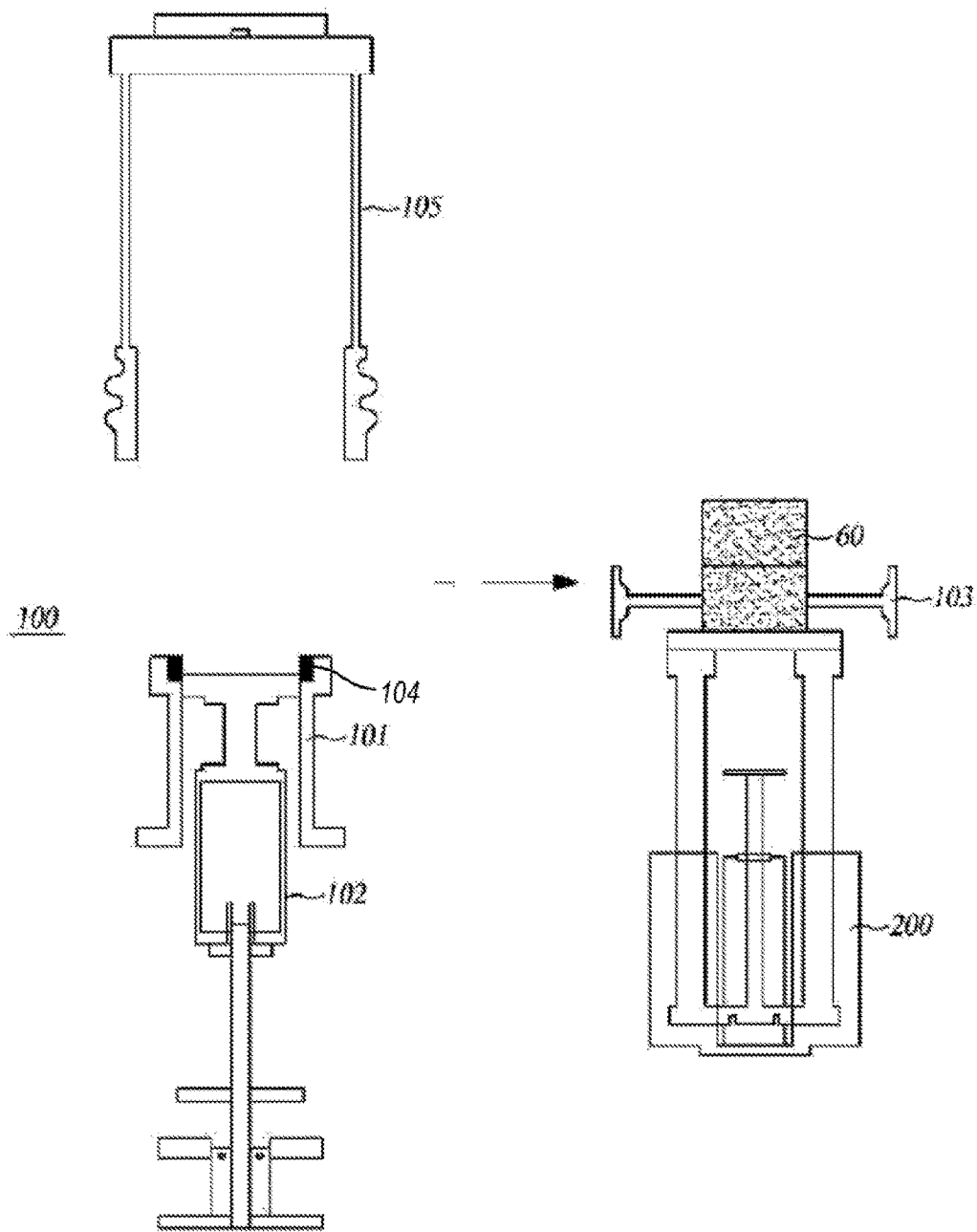

[FIG. 4]
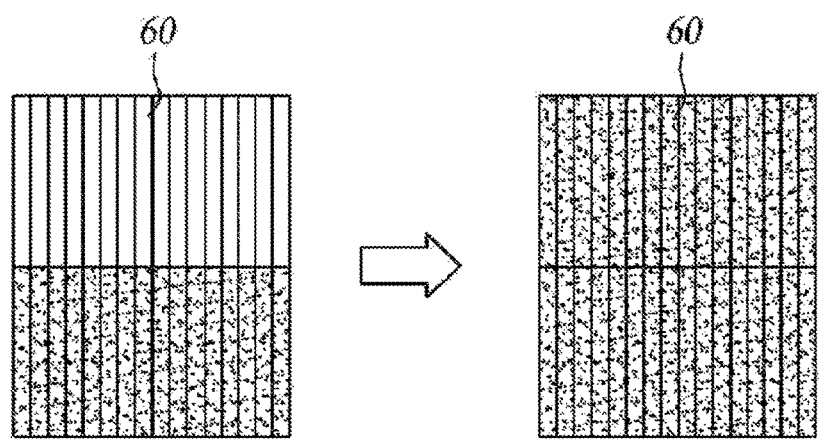

APPARATUS AND METHOD FOR QUANTITATIVELY COATING CATALYST SUPPORT

TECHNICAL FIELD

The present invention relates to an apparatus and method for coating a catalyst support having a plurality of channels with a predetermined amount of slurry. More particularly, the present invention relates to an apparatus and method for coating a catalyst support having a plurality of channels, such as a monolithic catalyst support used for a catalytic converter, with a predetermined amount of slurry.

BACKGROUND ART

A catalytic converter is a device for converting harmful components included in exhaust gas into harmless components through catalysis. A general type of catalytic converter has a monolithic support in which a plurality of longitudinal channels is coated with slurry containing various catalytic components (hereinafter, referred to as "catalyst slurry"). The monolithic support is made of ceramic or other materials. Various methods of coating a monolithic support with catalyst slurry are commonly known in the related field.

As indicated in U.S. Pat. No. 6,599,570, it is proposed that a vacuum is used in order to draw catalyst slurry upward through channels. For example, it is disclosed in U.S. Pat. No. 4,384,014 that, in order to remove air from channels, catalyst slurry is drawn upward through the channels by generating a vacuum over a monolithic support. Thereafter, the vacuum is released, and thus excessive catalyst slurry is removed by gravity discharge. Further, it is disclosed in U.S. Pat. No. 4,191,126 that a monolithic support is dipped into slurry, thus removing excessively-applied slurry from the surface of the monolithic support using pressure lower than atmospheric pressure.

Most of all, U.S. Pat. No. 4,609,563 is particularly noticeable. U.S. Pat. No. 4,609,563 discloses a metered charge system for catalytic coating of a substrate. This system includes a method of coating a ceramic monolithic support with a precisely-controlled predetermined amount (hereinafter, "quantitatively-determined amount") of catalyst slurry using a vacuum. Briefly explaining, the monolithic support is immersed into a quantitatively-determined amount of slurry (to be applied on the support) charged in a predetermined size container to a predetermined depth. In this case, the slurry is drawn by the vacuum applied to the end of the support opposite to the immersed end thereof. Therefore, it is expected that it is not required to discharge or remove excessive slurry from a substrate. However, even in this case, it is likely that it is difficult to coat the monolithic support with a precisely quantitatively-determined amount of slurry such that the profiles of channels in the monolithic support are uniform.

DISCLOSURE

Technical Problem

Particularly, U.S. Pat. No. 6,599,570 proposes an apparatus and method for quantitatively coating a monolithic support. This apparatus and method requires a slurry-transmissible film in order to solve the problems attributable to the recirculation of slurry. That is, in this apparatus and method, the coating of a monolithic support with a quantitatively-determined amount of slurry is accomplished by passing slurry through the slurry transmissible film. In this case, various types of slurry transmissible films are proposed, but the clogging and contamination of the slurry transmissible film attributable to the repetitive usage thereof several times are not likely to be overcome.

Technical Solution

The present invention provides a quantitative coating apparatus. More particularly, the present invention provides an apparatus for quantitatively coating a monolithic support having a plurality of longitudinal channels with catalyst slurry applied to the post-treatment of exhaust gas. In the present invention, the term "quantitatively coating" means that the plurality of channels of the monolithic support is nearly completely coated with a precisely-controlled predetermined amount of catalyst slurry. Here, the term "nearly completely coated" means that 1% or less of catalyst slurry in the total amount thereof is discharged without the channels of the monolithic support being coated therewith. The coating apparatus of the present invention includes means for introducing a predetermined amount of slurry, a top-open container charged with the predetermined amount of slurry, means for moving the container, and a vacuum means. This coating apparatus may further include a support fastener, means for sealing the support and container, and means for transporting the support.

Further, the present invention provides a quantitative coating method. More particularly, the present invention provides a method of quantitatively coating a monolithic support having a plurality of longitudinal channels with catalyst slurry applied to the post-treatment of exhaust gas. The coating method includes the steps of: introducing a predetermined amount of catalyst slurry into a container; moving a monolithic support to the top of the container; sealing the monolithic support and the container from the outside; moving the container upward; and applying a vacuum. This coating method may further include the steps of: releasing the sealing of the monolithic support and the container from the outside; and moving the monolithic support coated with the catalyst slurry. Moreover, this coating method may further include the steps of drying the monolithic support coated with the catalyst slurry; and calcining the dried monolithic support.

Advantageous Effects

According to the apparatus and method for quantitatively coating a monolithic support of the present invention, a quantitatively-determined amount of catalyst slurry is charged in the channels of the monolithic support, thus solving the conventional problems caused by excessive slurry. When a quantitatively-determined amount of catalyst slurry is forcibly charged in the channels of the monolithic support, the charged catalyst slurry primarily stays in the lower space of the channels, and then a part of the catalyst slurry charged by the vacuum means located over the monolithic support is secondarily drawn to the upper space of the channels to be deposited on all the walls of the channels, thereby obtaining the monolithic support uniformly coated with the catalyst slurry.

DESCRIPTION OF DRAWINGS

The above and other objects, features and advantages of the present invention will be more clearly understood from the following detailed description taken in conjunction with the accompanying drawings.

FIG. 1 is a schematic view of a conventional apparatus for coating a monolithic support.

FIG. 2 is a schematic view of another conventional apparatus for coating a monolithic support.

FIGS. 3A to 3F show an apparatus and process for coating a monolithic support according to the present invention.

FIG. 4 shows schematic sectional views of the primary state of slurry captured in the channels and the secondary state of slurry entirely applied on the channels.

BEST MODE

The present invention relates to an apparatus and method for coating a monolithic support, which is characterized in that the channels of the monolithic support are efficiently coated with a quantitatively-determined amount of catalyst slurry.

The sentence "a quantitatively-determined amount of catalyst slurry is applied", used in the present application, means that the channels of the monolithic support are coated in one step with nearly the entire amount of catalyst slurry charged in a container necessary for coating. Generally, catalyst slurry is charged in the longitudinal direction of a support. Therefore, when excessive slurry is charged in the channels of the support, a predetermined amount of slurry is deposited on the walls of the channels to be applied thereon, but an excessive amount of slurry is discharged from the support. In contrast, the present invention is configured such that a predetermined amount of catalyst slurry is measured and introduced into a container, and this catalyst slurry is entirely charged in the channels of a monolithic support, and thus there is scarcely any catalyst slurry discharged from the channels. The amount of catalyst slurry necessary for coating at once may be determined by a preliminary experiment. Thus, the present invention relates to an apparatus and method for charging a predetermined amount of catalyst slurry in a monolithic support.

MODE FOR INVENTION

According to an embodiment of the present invention, in order to coat a support with catalyst slurry, a vacuum coating method is not necessarily applied. Generally, as a method of coating a support with catalyst slurry, only a vacuum coating method has been employed. However, the present inventors found that catalyst slurry moved by physical pressure is precisely quantitatively applied compared to a vacuum coating method. Here, the term "physical pressure" is in contrast with a conventional vacuum coating method, wherein catalyst slurry is placed at one side of a support, and vacuum means is placed at the other side thereof to apply a vacuum to the catalyst slurry through the channels of the support by the vacuum means, thus allowing the catalyst slurry to be charged into the channels of the support depending on the degree of vacuum. In the present invention, the term "physical pressure" means that catalyst slurry is placed at one side of a support, and physical pressure including mechanical pressure is applied to the catalyst slurry to pressurize the catalyst slurry, and thus the pressurized catalyst slurry is charged into the channels of the support. That is, in the present invention, the term "physical pressure" means that a vacuum coating method using a vacuum means is excluded, and that, after the catalyst slurry is charged into the channels of the support once, a vacuum means can be used in order to expand the distribution of the catalyst slurry in the channels of the support.

According to another embodiment of the present invention, in order to coat a support with catalyst slurry, a coating method, wherein a charging means and catalyst slurry are placed only one side of a support, rather than both sides (upper and lower sides) thereof, is employed. According to a conventional coating method, catalyst slurry is placed at upper and lower sides of a support, and means for charging the catalyst slurry, suction means and vacuum means are also placed at the upper and lower sides thereof. However, according to the present invention, the charging means and catalyst slurry are placed at only a lower side of a support, and thus the support can be precisely quantitatively coated with the catalyst slurry.

FIG. 1 shows a conventional coating apparatus. In the conventional coating apparatus 2, generally, a monolithic support (not shown) is loaded in a support clamp 4 located on a shelf 6, and, when an operator pushes a start button, the monolithic support is inserted in a dip pan charged with catalyst slurry supplied from a storage tank 16 in order to coat the monolithic support with the catalyst slurry. When the monolithic support is located such that it comes into contact with the catalyst slurry, a low-intensity vacuum is applied through a line 10 of a vacuum cone 12 connected to the monolithic support. Since the amount of catalyst slurry charged in the dip pan 14 exceeds the amount of catalyst slurry necessary for completing a coating work, the catalyst slurry is charged into the monolithic support, but excessive catalyst slurry is discharged from the monolithic support. The discharged catalyst slurry is recycled to cause various problems. In order to solve the above problems, FIG. 2 shows another conventional coating apparatus. In this convention coating apparatus, a predetermined amount of catalyst slurry is introduced into a container 3 mounted on a support 5 by quantitative slurry supply means 1. Meanwhile, the bottom of the container 2 is provided with a porous film 4 for passing catalyst slurry using vacuum means 9. When the space between the porous film 4 and the support 5 is sealed by sealing means and then a vacuum is applied to the bottom of a gas-permeable film 8 located on a table 7 mounted with the support 5, the entire amount of catalyst slurry is charged into the channels in the support 5. However, this conventional coating apparatus is also problematic in that the porous film 4 is contaminated, and thus the quantification of catalyst slurry becomes difficult.

FIG. 3 shows an apparatus and process for coating a monolithic support according to the present invention.

The apparatus 100 for coating monolithic support according to the present invention includes: means for introducing a predetermined amount of slurry; a volume-variable container 101 including an open top for introducing the predetermined amount of slurry and a movable bottom; means 102 for moving the bottom of the container 101; and vacuum means 105. In addition to the above essential constituents, this coating apparatus 100 according to the present invention further includes: a clamp 103 for fastening a support 60; and means 104 for sealing the support 60 and the container 101.

In the coating apparatus according to the present invention, the volume-variable container 101 is disposed under the support 60. Specifically, the upper end of the volume-adjustable container 101 is flush with the lower end of the support 60. Preferably, the volume-variable container 101 is configured such that its section corresponds to that of the support 60. Since slurry charged in the container 101 is introduced into the channels of the support 60 by physical pressure during a coating procedure, the section of the container 101 must correspond to that of the support 60 for the purpose of perfect quantitative slurry charging. The volume of the container 101 is variable. The container 101 includes a circumferential wall and a bottom, and the position of the bottom can be changed. That is, the bottom of the container 101 can be moved upward and downward because it is connected with vertical moving means 102. Therefore, when the bottom of the container 101 is moved upward, the volume of the container decreases, and, when the bottom of the container 101 is moved downward, the volume thereof returns to the original volume thereof. The bottom of the container 101 can be tightly glided along the wall thereof. The gap between the bottom and wall of the container 101 may be sealed by sealing means. The fact that the bottom thereof is tightly glided means that slurry charged in the container 10 does not leak out through the gap formed between the bottom and wall of the container 101 while the bottom thereof is moved along the wall thereof. The horizontality of the bottom of the container can be maintained by specific means, for example, a horizontality sensor. The container 101 may be made of various materials, and the raw materials of the bottom and wall thereof may be identical to each other or different from each other. Preferably, the wall and bottom thereof may be made of stainless steel.

The bottom of the container 101 is connected with moving means 102. Generally, driving means and a shaft connected therewith may constitute the moving means 102, and the shaft may be connected to the bottom of the container 101. Meanwhile, the top of the container 101 is provided with sealing means 104. The sealing means 104 is configured such that, when catalyst slurry charged in the container 101 by the bottom of the container 101 moved by the moving means 102 is introduced into the support 60 through the lower channel of the support 60, the catalyst slurry is entirely charged in the channels of the support 60, that is, the catalyst slurry is not discharged to the outside of the support 60. The sealing means 104 is provided at the top of the container 101 and the bottom of the support 60. Preferably, the sealing means 104 is composed of an O-ring, and the bottom of the support 60 is hermetically sealed by the O-ring. The support 60 is disposed such that the bottom of the support 60 is horizontally matched with the top of the container 101 by the following support fastener 103. Since the section of the container 101 is matched with the section of the support 60, when the support 60 is disposed such that the bottom of the support 60 is horizontally matched with the top of the container 101, the sealing means 104 is operated around the top of the container 101 and the bottom of the support 60, so the top of the container 101 and the bottom of the support 60 are hermetically sealed, thereby preventing the slurry from being discharged to outside of the sealing means 104.

The present invention intends to charge a predetermined amount of catalyst slurry into the channels of the support. When a predetermined amount of catalyst slurry is charged into the channels of the support, this slurry is charged into the lower space of the support, and then a part of the slurry is drawn to the upper space thereof by vacuum means to allow the slurry to be deposited on the walls of the channels thereof, thereby coating the channels thereof with the slurry. In this case, since a predetermined amount of slurry is introduced in the early stage, excessive slurry is not discharged to the outside through the channels of the support. Therefore, a precise amount of slurry is introduced into the container 101 by quantitative slurry supply means (not shown). The precise amount thereof may be varied depending on the characteristics, use and the like of the support, and may be determined by a preliminary experiment. The determined amount of slurry is introduced into a volume-variable container by the quantitative slurry supply means commonly known to those skilled in the art.

The support 60 of the present invention may have various structures, but, preferably, may have a monolithic structure in which a plurality of channels is longitudinally arranged in parallel to each other. Generally, the support 60 may be made of ceramic, metal or plastic such that it is used at low temperature. Further, the monolithic structure is composed of parallel microchannels extending from the bottom of the support to the top of the support, and gas can flow through these channels. The section of each of the channels may have various shapes, such as a rectangle, a square, a hexagon, an ellipse, a circle, a trapezoid, etc., and may have various sizes. The section of the support includes 600 channels per square inch. In the present invention, the kind of catalyst slurry is not particularly limited. For example, the catalyst slurry may be ternary catalyst slurry, catalyst slurry for diesel oxidation, catalyst slurry for removing nitrogen oxides, and the like. Of course, the present invention is not limited to catalyst slurry for automobiles, and, moreover, is not applied to slurry.

Returning to FIG. 3, attached appliances necessary for the coating apparatus 100 of the present invention will be described, but are commonly known to technicians in the related field. First, a support fastener 103 transports a support from a shelf 200 to the top of a container. The support fastener 103 serves to fasten the support, and has a plate-shaped clamp, by which the lower portion of the support is exposed, but is not limited thereto. Through the support transportation and the support fastener, as described above, the bottom of the support and the top of the volume-variable container may be horizontally disposed each other. The coating apparatus of the present invention may further include blowing means. The catalyst slurry charged by physical pressurization is deposited and applied on the walls of the channels of the support, but, according to circumstances, the channels of the support may be plugged. In this case, the blowing means can overcome the problem of plugging the channels of the support by blowing air into the channels. The coating may be performed one time or two times, the upper and lower portions of the support may be alternately coated, and the slurry may be dried or calcined after the coating. Such sub-systematic constituents are commonly known in the related field. The commands necessary for operating the coating apparatus 100 can be controlled by readable programs in a computer (not shown).

The coating apparatus of the present invention is characterized in that slurry is not introduced into the channels of the support by a vacuum method. That is, the coating apparatus of the present invention is characterized in that slurry is forcibly introduced into the channels of the support by physical pressure, and then the slurry charged in the channels is uniformly distributed on the walls of the channels by a vacuum. Further, this coating apparatus is characterized in that the container and the slurry charging means are disposed at one side thereof.

Another embodiment of the present invention provides a method of quantitatively coating a support with catalyst slurry. More particularly, the present invention provides a method of quantitatively coating a monolithic support, in which a plurality of channels is longitudinally formed, with catalyst slurry, which is applied to the post-treatment of exhaust gas. The coating method according to the method includes the steps of: introducing catalyst slurry into a quantitative container; moving a monolithic support to the top of the container; sealing the monolithic support and the container from the outside; moving the container upward;

and applying a vacuum to the channel of the monolithic support. This coating method may further include the steps of: releasing the sealing of the monolithic support and the container from the outside; and moving the monolithic support coated with the catalyst slurry. Moreover, this coating method may further include the steps of: drying the monolithic support coated with the catalyst slurry; and calcining the dried monolithic support.

The coating process will be described with reference to FIG. 3. First, a support 60 is inserted into a support fastener 103 to be disposed at a waiting place. The procedure of inserting the support 60 into the support fastener 103 may be performed by an automated robot system. Referring to FIG. 3A, a predetermined amount of catalyst slurry is introduced into a container 101. The introduction of catalyst slurry is performed by a quantitative slurry supply means (not shown). The amount of catalyst slurry may be varied depending on the characteristics, use and the like of the support, and may be determined by a preliminary experiment. Referring to FIG. 3B, the bottom of the support is transported by the support fastener 103 such that the bottom of the support is horizontally matched with the top of the container. Thereafter, the gap between the bottom of the support and the top of the container is hermetically sealed by sealing means 104 mounted on the container (refer to FIG. 3C). The container bottom moving means 102 moves upward, and thus the bottom of the container moves toward the bottom of the support. In this case, since additional outlets do not exist except for the top of container and the channels of the support, the catalyst slurry moved upward by the bottom of the container is introduced into the channels of the support. The upward movement of the bottom of the container stops when the bottom of the container comes into contact with the bottom of the support (refer to FIG. 3D). Referring to FIG. 3D, a predetermined amount of slurry charged in the container is introduced into the channels of the support by the upward movement of the bottom of the container. Particularly, the slurry is charged in the space (L) located under the channels of the support. Subsequently, when a precisely-adjusted vacuum is applied by a vacuum means 105 located over the support, a part of the slurry charged in the space (L) located under the channels of the support, preferably, a half of the slurry is moved to the space (U) located over the channels of the support, and thus all of the inner walls of the channels of the support are entirely coated with the slurry (refer to FIG. 4). After the coating of the channels of the support, referring to FIGS. 3E and 3F, the sealing of the top of the container and the bottom of the support is released, the support coated with the slurry is moved to another place by the support fastener, and then required procedures, for example, drying and calcining, are carried out, thus completing the coating.

The invention claimed is:

1. A method of quantitatively coating a plurality of longitudinally formed channels of a monolithic catalyst support having a top and a bottom with a catalyst slurry for treating exhaust gas, the method comprising the steps of:
    a) introducing the catalyst slurry into a volume-adjustable container, the volume-adjustable container having an open top and a movable bottom;
    b) after step a, disposing the catalyst support on the volume-adjustable container such that the bottom of the catalyst support is horizontally disposed on the open top of the volume-adjustable container;
    c) after step b, sealing the bottom of the catalyst support to the open top of the volume-adjustable container;
    d) after step c, moving the movable bottom of the volume-adjustable container upward, thereby
        moving the catalyst slurry from the volume-adjustable container sealed to the bottom of the catalyst support into a bottom portion of the plurality of longitudinally formed channels by physical pressure and partially coatng the plurality of longitudinally formed channels; and
    e) after step d, applying a vacuum to the plurality of partially coated longitudinally formed channels of the catalyst support and releasing the seal between the bottom of the catalyst support and the open top of the volume-adjustable container; thereby quantitatively coating the plurality of longitudinally formed channels of the catalyst support with the catalyst slurry.

2. The method of claim 1, further comprising moving the catalyst support coated with the catalyst slurry after the step of applying the vacuum, such that the catalyst support coated with the catalyst slurry is not disposed on the volume-adjustable container.

3. The method of claim 2, further comprising the steps of drying the catalyst support coated with the catalyst slurry and calcining the dried catalyst support.

4. The method of claim 2, further comprising the step of moving the movable bottom of the volume-adjustable container downward after the step of moving the catalyst support coated with the catalyst slurry.

* * * * *